(12) United States Patent
Sano et al.

(10) Patent No.: US 9,364,976 B2
(45) Date of Patent: Jun. 14, 2016

(54) COMPOSITE FORMING MATERIAL

(75) Inventors: Shuji Sano, Tokyo (JP); Masaya Tsukamoto, Tokyo (JP); Kenichiro Teragami, Tokyo (JP); Toru Murakami, Tokyo (JP)

(73) Assignee: Mr. Masanori Fujita, Tokyo (JP)

( * ) Notice: Subject to any disclaimer, the term of this patent is extended or adjusted under 35 U.S.C. 154(b) by 233 days.

(21) Appl. No.: 13/486,173

(22) Filed: Jun. 1, 2012

(65) Prior Publication Data

US 2012/0252932 A1     Oct. 4, 2012

(30) Foreign Application Priority Data

Mar. 8, 2010   (JP) .................................. 2010-050390

(51) Int. Cl.
| | | |
|---|---|---|
| *C08K 7/14* | (2006.01) | |
| *B29C 45/00* | (2006.01) | |
| *C08K 9/06* | (2006.01) | |
| *C08K 7/20* | (2006.01) | |
| *C08J 5/04* | (2006.01) | |
| *C08K 9/04* | (2006.01) | |
| *B29K 309/08* | (2006.01) | |

(52) U.S. Cl.
CPC ............. *B29C 45/0005* (2013.01); *C08J 5/043* (2013.01); *C08K 7/20* (2013.01); *C08K 9/06* (2013.01); *B29K 2309/08* (2013.01); *C08K 9/04* (2013.01); *C08K 2201/003* (2013.01); *C08K 2201/004* (2013.01)

(58) Field of Classification Search
CPC .............. C08K 7/14; C08K 9/06; C08K 7/20; C08K 9/04; C08K 2201/003; C08K 2201/004
USPC .................................................. 524/847, 494
See application file for complete search history.

(56) References Cited

U.S. PATENT DOCUMENTS 5,300,547 A * 4/1994 Hagenson et al. ............. 524/188
5,972,503 A * 10/1999 Woodside ...................... 428/378

FOREIGN PATENT DOCUMENTS

| JP | 62-101433 A | | 5/1987 |
|---|---|---|---|
| JP | S62-185746 A | | 8/1987 |
| JP | H06-49344 A | | 2/1994 |
| JP | 11170385 A | * | 6/1999 |
| JP | 2006-131877 A | | 5/2006 |
| JP | 2009-007179 A | | 1/2009 |
| JP | 2009-215492 A | | 9/2009 |

* cited by examiner

*Primary Examiner* — Ling Choi
*Assistant Examiner* — David L Miller
(74) *Attorney, Agent, or Firm* — Carrier Blackman & Associates, P.C.; Joseph P. Carrier; Anne G. Sabourin

(57) ABSTRACT

A composite forming material of the present invention in which a fiberglass and a thermoplastic resin are compounded, where the fiberglass is a glass wool and a surface treatment is performed on the glass wool by spraying a solution which includes a silane coupling agent and/or a film former, a weight percent of the silane coupling agent to the glass wool is 0.24 wt %, and a weight percent of the film former to the glass wool is 2.4 wt %, the mean length of the glass wool is 600 μm, and the diameter is 3.4 μm.

2 Claims, 3 Drawing Sheets

Before burning

After burning

COMPOSITE FORMING MATERIAL

FIELD OF THE INVENTION

This invention relates to a composite forming material which mixes a thermoplastic resin used for the injection molding and fiberglass.

BACKGROUND ART

When a matrix resin is thermoplastic, a fiber reinforced plastic is called a FRTP (Fiber Reinforced Thermo Plastics), this FRTP has a strength, hardness to transform to heat and stability of dimensions in comparison with a matrix resin.

Therefore, to satisfy a requirement for a light weight, an ejection cast of FRTP is used as a replacement for metal and ceramic, such as in the housing of electronic devices, electric-electronic parts and automotive parts. The diameter of a continuous glass filament (long length fiber glass) used for FRTP is 10-18 μm.

It is described in Prior art 1 that an aldehyde scavenger, a film former and a silane coupling agent are combined into a convergence agent for fiberglass, thereby, it solves a problem in that a gas such as a formaldehyde is generated at the time of forming or from a cast by the resolution of the polyacetal resin.

Specifically, a convergence agent for fiberglass having at least three kinds of ingredients is proposed. The three kinds of ingredients are a film former having a function to form a film to a glass surface, an aldehyde scavenger which catches gas such as a formaldehyde and a silane coupling agent which has a functional group easily coupled with silicon comprising glass and a functional group easily coupled with organic body such as a resin.

PRIOR ART

Patent Document

[Prior Art 1] Japanese Laid Open Patent No. 2009-007179

DISCLOSURE OF INVENTION

Problems Solved by the Invention

However, as the diameter of continuous glass filament used for FRTP is 10-18 μm, when molding FRTP containing 20-50% of fiber at a thin thickness (1 mm or less), uniform dispersibility of the fiber is damaged, and it results in an irregularity on the surface of an ejection cast. As a result there is a problem, as seen in a scanning electron micrograph of FIG. 1, with a defect in the surface smoothness in that some fibers stand out.

The object of the present invention is to solve the above described problems. The present invention offers a composite forming material with fiberglass and a thermoplastic resin enabling thin-thickness injection molding.

Means for Solving Problems

In order to solve the above described problems, the invention of claim 1 is a composite forming material characterized that a fiberglass and a thermoplastic resin are mixed, and the fiberglass is glass wool (short length fiberglass).

The glass wool is given a surface treatment by spraying a solution including a silane coupling agent or a silane coupling agent and a film former.

And a weight percent of the silane coupling agent to the glass wool is 0.1-2.0 wt %, preferably 0.15-0.4 wt %, more preferably 0.24 wt %, and a weight percent of the film former to the glass wool is preferably 5-15 times to the weight of the silane coupling agent.

In addition, the length of the glass wool is not limited in particular, but it is preferable that the mean length of fiber is around 300-1000 μm with a diameter of fiber is 3-6 μm.

Because, if the mean length of fiber is less than 300 μm, an aspect ratio becomes small and a reinforcement effect cannot be expected. If the mean length of the fiber exceeds 1,000 μm, dispersion of the fiber to resin becomes insufficient, fibers intertwine with each other, air is taken between fibers and this causes voids to form.

Effects of the Invention

FIG. 2 shows a scanning electron micrograph (500 times) of the surface of an ejection cast of 0.8 mm thickness, (a) represents non-additive, (b) represents contains 20 wt % of chopped strand of 13 μm of diameter 3 μm of length (CSF 3PE 455S (made by NTB)), (c) represents contains 20 wt % of milled fiber of 13 μm of diameter 100 μm of length (MF06MW2-20 (made by AFG)), the milled fiber is made by powdering the chopped strand, (d) represents 20 wt % of glass wool of the present invention, the diameter of the glass wool is 34 μm, the length of the glass wool is 600 μm.

From FIG. 2, it can be seen that the composite forming material of the present invention does not damage the smoothness of the ejection cast surface.

FIG. 3 (a) is a photograph before the burning of composite forming materials of the present invention, (b) is a photograph after the burning of composite forming materials of the present invention, from these photographs, it can be seen that the glass wool disperses uniformly in the resin at the time of injection molding.

In addition, according to the present invention, using a glass wool of which length and diameter are small in comparison with continuous glass filament as a reinforcing structure, forming of thin thickness can be done easily, it can reduce poor appearance even if making ejection casts with a thickness of 1 mm or less.

And conventionally, it was thought that the glass wool did not have the reinforcement effect, but a reinforcement effect which is not inferior to chopped strand was confirmed.

BEST MODE FOR CARRYING OUT THE INVENTION

Figure 1:
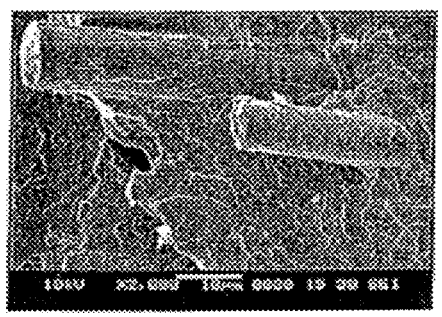
FIG. 1 Scanning electron micrograph (2,000 times) of the surface of a usual FRTP.
Figure 2A:
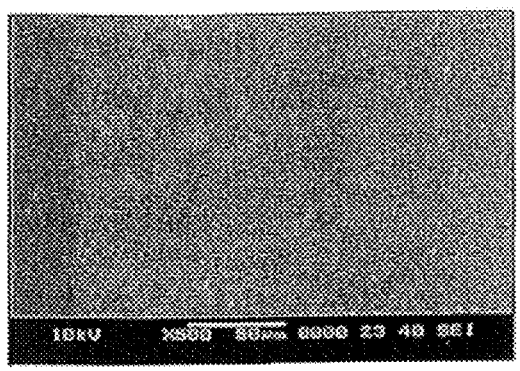
FIG. 2 Scanning electron micrograph (500 times) of a ejection cast surface, (a) represents non-additive, (b) represents chopped strand, (c) represents milled fiber, (d) represents the present invention.
Figure 2B:
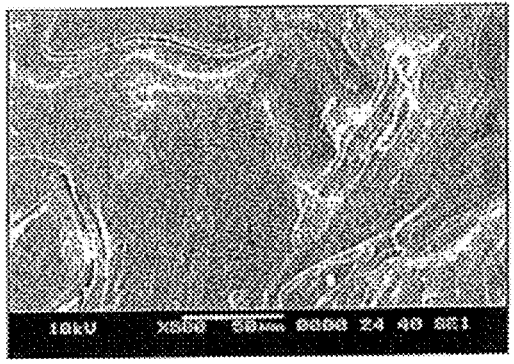
Figure 2C:
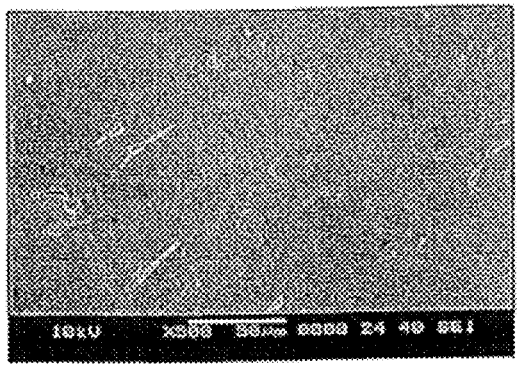
Figure 2D:
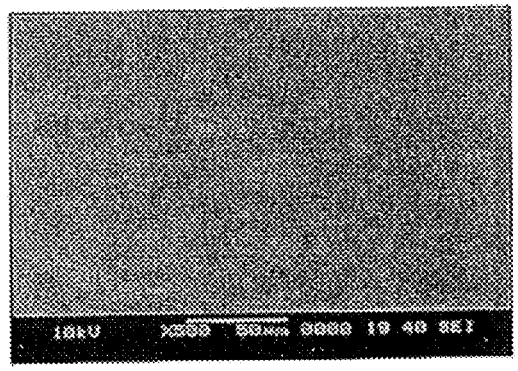
Figure 3A:
FIG. 3 (a) Photograph before the burning of composite forming materials of the present invention, (b) Photograph after the burning of composite forming materials of the present invention.
Figure 3B:

The present invention offers FRTP having strength at the same level as conventional FRTP using continuous glass filament and can mold a thin thickness ejection cast, showing that industrial production is possible using glass wool as a glass reinforcing structure for FRTP.

FRTP which contains conventional chopped strand generally includes 20-50 wt % of continuous glass filament of 10-18 μm diameter. When the thickness of the ejection cast is thinned to 1 mm or less, the fiber does not spread out uniformly on the inside of the resin and causes poor appearance. This problem will be solved by reducing the diameter of the fiber down to several μm degree or making the fiber fine.

In the former case, it is technically possible but increases cost since productivity deteriorates remarkably. In the latter case, cost is also increased since a grinding step is required, and the reinforcement effect decreases.

There is a superior reinforcement effect when the ratio of diameter and length (aspect ratio) is large.

The glass wool is manufactured by turning a spinner at high speed, the spinner provides a lot of small holes of about 1 mm in diameter to the surroundings.

This manufacturing process is generally known as a centrifuge method. In this manner thin fiber of about 3-4 μm in diameter can be manufactured economically.

By using this glass wool for the reinforcing structure of FRTP, thin thickness casts of 1 mm or less with a smooth surface can be obtained. There is no poor appearance.

Also, regarding the strength of FRTP, usually if the diameter is the same, it is advantageous that the length of the fiberglass be long. So, it was considered that glass wool, the length of which is ½~⅓ that of the continuous glass filament, was inappropriate, because it was deemed that the reinforcing structure effect was poor using glass wool.

However, even when using glass wool, a reinforcement effect at the same level as conventional FRTP containing a continuous glass filament can be obtained in the condition where the glass wool has a length above a certain level and a proper surface treatment is performed on a fiber surface responding to matrix resin.

Because the diameter of the glass wool is smaller than the diameter of the continuous glass filament, if the content of the resin is the same, the total surface area of the glass wool is larger than that of the continuous glass filament.

As described above, when the total surface area of the glass wool is larger than that of the continuous glass filament, FRTP containing glass wool having a disadvantage in a length becomes equal to FRTP containing a continuous glass filament in strength.

Example 1

Polyamide (PA) resin (Nova Mid made by Mitsubishi Engineer Plastic Co., Ltd.) was used as the matrix thermoplastic resin, 3-aminopropyltriethoxysilane (Z-6011 made by Toray-Dow Corning Co., Ltd.) was used as the silane coupling agent, epoxy resin (EM-058 made by Adeca Co., Ltd.) was used as the film former, and glass wool was manufactured by the centrifuge method and the average diameter was approximately 3.4 μm.

Prepared glass wool by centrifuge method using spinner, and carried out surface treatment of the glass wool by spraying a solution including silane coupling agent and film former from binder nozzle, at this time, as for the weight percent to the glass wool, silane coupling agent was 0.24 wt %, film former was 2.4 wt %.

After the glass wool was dried at 150 degrees Celsius for one hour, the glass wool was crushed so that a mean length became 600 μm by cutter mil. Kneading of the glass wool was performed by surface treatment with PA resin using a twin extruded kneader, and a prepared resin pellet added to the glass wool, and FRTP (Example 1) was made by injection-molding the resin.

Subsequently, to evaluate mechanical strength, tensile strength was measured by forming the FRTP as 110×10×1 mm, and bending strength was measured by forming the FRTP as 80×10×1 mm.

As shown in Table 1, in comparison with PA resin simple substance (Reference 1), the tensile strength improved approximately 1.4 times.

After the measurement, a break surface of the specimen was observed with a scanning electron microscope, then, it was observed that PA resin climbed all over the fiber, therefore, it can be shown that the interfacial adhesion state of the resin and fiber is good.

TABLE 1

| | | | Example 1 | Reference 1 | Reference 2 | Reference 3 | Reference 4 | Reference 5 |
|---|---|---|---|---|---|---|---|---|
| Blending | PA resin | wt % | 80 | 100 | 80 | 80 | 80 | 80 |
| | glass wool | | 20 | | | | 20 | 20 |
| | chopped strand | | | | 20 | | | |
| | milled fiber | | | | | 20 | | |
| characteristic evaluation | Mean fiber length | μm | 600 | | 3000 | 100 | 200 | 1200 |
| | Tensile strength | Mpa | 70.5 | 50.8 | 76.5 | 60.0 | 59.5 | 63.5 |
| appearance evaluation | void | | non | non | exist | non | non | exist |

And to carry out competitive examination of the tensile strength, likely to the glass wool, commercial chopped strand and milled fiber with PA resin was kneaded using a twin extruded kneader, and FRTP specimen was made by injection-molding the resin.

FRTP (Reference 2) contained chopped strand of which content is equal to the content of the glass wool, the tensile strength of Reference 2 improved approximately 1.5 times in comparison with PA resin simple substance (Reference 1).

The tensile strength of FRTP (Example 1) containing glass wool was slightly lower than Reference 2 but it was approximately at the same level.

It indicates that, as for strength chopped strand is more dominant in respect to the length of fiber, however, if the weight ratio of the fiber is equal, as for the surface area, glass wool is larger than chopped strand, glass wool is superior to chopped strand in the adhesive power of the interface of the resin and fiber.

And FRTP (Example 1) containing glass wool showed high tensile strength in comparison with FRTP (Reference 3) containing milled fiber.

The reason for this result is guessed that the length of the milled fiber is approximately 100 μm, this length is short, and milled fiber has a diameter equivalent to that of the continuous glass filament, then, sufficient reinforcement effects were not provided In addition, the relation between a length of fiber and a void was inspected. A length of Reference 2 was 3,000 μm, and a length of Reference 5 was 1,200 μm, and voids were both observed.

It was as expected the length of fiber is long, dispersibility is bad, fibers are twisted up and air remained inside.

In contrast, voids were not seen to be generated in Example 1, Reference 3 and Reference 4.

When injection-molding a thin cast of about 1 mm thickness using conventional resin which contained fiberglass, poor appearance was easily caused, such as losing surface smoothness.

Then, regarding Reference 1-3 and Example 1, prepared 0.8 mm thickness of ASTM D1822 Type L-form pulling specimen using injection molding machine, and observed the surface of the specimen with a scanning electron microscope.

The surface of the specimen which was prepared from PA resin simple substance (Reference 1) was smooth.

On the other hand, in the case of FRTP contained chopped strand (Reference 2), not only were defects (voids) observed due to the lack of the filling pressure at the time of the ejection but also a part where the surface was irregular. It is expected that the cause of this irregularity is due to the chopped strand of 13 μm diameter dispersed in the vicinity of the surface of the specimen.

Also, some voids were observed in FRTP (Reference 3) which contained milled fiber, but there was no big irregular part on the surface and this was relatively smooth.

There was no poor appearance such as in reference example two or three in FRTP (Example 1) which contained glass wool.

Therefore, in a respect of the surface smoothness, the superiority of glass wool was demonstrated.

Conventionally, it was considered that there was not a reinforcement effect in FRTP (Example 1) contained glass wool, however, it was demonstrated that FRTP (Example 1) containing glass wool has a surface smoothness like PA resin simple substance (Reference 1) and FRTP (Example 1) containing glass wool has a reinforcement effect which is not inferior to FRTP (Reference 2) containing chopped strand.

Also, FRTP (Reference 3) containing milled fiber is better than FRTP (Reference 2) containing chopped strand in surface smoothness, however FRTP (Reference 3) was inferior in its reinforcement effect.

Example 2

Polybuthyleneterephthalate (PBT) resin (Nova Duran 5010R5N made by Mitsubishi Engineer Plastic Co., Ltd.) was used as the matrix thermoplastic resin, 3-aminopropyltriethoxysilane (Z-6011 made by Toray-Dow Corning Co., Ltd.) and 3-glycidoxypropyltrimethoxysilane (Z-6040 made by Toray-Dow Corning Co., Ltd.) were used as the silane coupling agent, epoxy resin (EM-058 made by Adeca Co., Ltd.) was used as the film former, this combination is shown in Table 2.

And glass wool was manufactured by the centrifuge method and the average diameter was approximately 3.4 μm.

Prepared glass wool by centrifuge method using spinner, and carried out surface treatment to the glass wool by spraying a solution (three kinds) including a silane coupling agent and/or film former from binder nozzle.

After drying the glass wool at 150 degrees Celsius for one hour, crushed the glass wool so that a mean length became 600 μm by cutter mil. And kneaded the glass wool performed surface treatment with PBT resin using laboplastmil, and prepared 3 kinds of FRTP (Example 2-1, Example 2-2, Example 2-3)

Pressed FRTP (Example 2-1, Example 2-2, Example 2-3) while heating at 250 degrees Celsius, this temperature is the melting point of PBT. Subsequently, punch FRTP (Example 2-1, Example 2-2, Example 2-3) with lever-type cutting machine, and made pulling specimen of JIS K 7113 2 type, then measured tensile strength with pulling testing equipment.

As shown in Table 2, it is confirmed that FRTP (Example 2-1, Example 2-2, Example 2-3) on which surface treatment was performed has 1.13 times, 1.31 times and 1.49 times strength improvement for each.

Example 3

Add 1% of U-Mex 1010 (made by Sanyo Kasei Kougyo Ltd.) to polypropylene (PP) resin (Novatech BC03B made by Nihon Polychem Co., Ltd.), and this was used as the matrix thermoplastic resin, 3-aminopropyltriethoxysilane (Z-6011 made by Toray-Dow Corning Co., Ltd.) was used as the silane coupling agent, epoxy resin (EM-058 made by Adeca Co., Ltd.) was used as the film former.

Prepared glass wool by centrifuge method using spinner, and carried out surface treatment to the glass wool by spraying a solution including a silane coupling agent (0.24 wt %) and film former (2.4 wt %) from binder nozzle.

After drying the glass wool at 150 degrees Celsius for one hour, crushed the glass wool so that a mean length became 600 μm by cutter mil. And kneaded the glass wool with PP resin using twin extruded kneader, and prepared a resin pellet FRTP Using this FRTP for materials, pulling specimen, bending specimen and shock specimen were made by injection molding machine. Tensile strength, bent strength and shock strength were measured.

Also, for a comparison, using chopped strand (made by Nlttobo Co., Ltd.) in substitution for glass wool, kneaded in same condition as Example 3 and made specimen, then measured tensile strength, bent strength and shock strength.

TABLE 2

| | | | Example | | | Reference |
| --- | --- | --- | --- | --- | --- | --- |
| | | | 2-1 | 2-2 | 2-3 | 6 |
| Blending | PBT resin 5010R5N | wt % | 79.4 | 79.4 | 79.4 | 100 |
| | silane coupling agent z-6011 | | 0.05 | 0.05 | | |
| | silane coupling agent z-6040 | | | | 0.05 | |
| | film former EM-058 | | | | 0.47 | |
| | glass wool | | 20.6 | 20.6 | 20.6 | 0 |
| characteristic evaluation | tensile strength | MPa | 61.0 | 70.4 | 79.9 | 53.8 |

TABLE 3

| | | | Example | Reference | |
| --- | --- | --- | --- | --- | --- |
| | | | 3 | 7 | 8 |
| Blending | PP resin (BC03B:1010 = 99:1) | wt % | 80 | 100 | 80 |
| | glass wool | | 20 | | |
| | chopped strand | | | | 20 |
| characteristic evaluation | tensile strength | MPa | 39.0 | 25.4 | 50.1 |
| | bent strength | | 49.1 | 31.1 | 56.7 |
| | shock strength | kJ/m² | 4.10 | 3.31 | 5.86 |

As shown in Table 3, it is confirmed that Example 3 (kneaded glass wool performed surface treatment in PP resin) improves 1.54 times in tensile strength, 1.58 times in bent strength and 1.24 times in shock strength.

Neither measurement result t is superior to the result of FRTP contained 20 wt % of chopped strand, but reinforcement effect of glass wool was confirmed by Example 3.

Example 4

Polybuteleneterephthalate (PBT) resin of non-halogen/incombustible type (Juranex XFR4840 made by Polyplastics Co., Ltd.) was used as matrix thermoplastic resin, 3-glycidoxypropyltrimethoxysilane (Z-6040 made by Toray-Dow Corning Co., Ltd.) was used as silane coupling agent, epoxy resin (EM-058 made by Adeca Co., Ltd.) was used as film former.

Prepared glass wool by centrifuge method using spinner, and carried out surface treatment to the glass wool by spraying a solution including a silane coupling agent (0.24 wt %) and film former (2.4 wt %) from binder nozzle.

After drying the glass wool at 150 degrees Celsius for one hour, kneaded the glass wool with PBT resin using laboplastmil, and prepared FRTP (Example 4)

Punch this FRTP (Example 4) and made pulling specimen, then measured tensile strength using pulling testing equipment.

And using commercial fiber reinforced plastic (6840 GF30) containing 30 wt % of chopped strand into PBT resin, kneaded them in the same condition as Example 4 and made a specimen, then measured tensile strength of the specimen.

TABLE 4

| | | | Example | Reference | |
|---|---|---|---|---|---|
| | | | 4 | 9 | 10 |
| Blending | PBT resin 4840 | wt % | 70 | 100 | |
| | glass wool | | 30 | | |
| | resin contained 30 wt % of chopped strand | | | | 100 |
| characteristic evaluation | tensile strength | MPa | 63.1 | 48.0 | 50.1 |

As shown in Table 4, it is confirmed that Example 4 (kneaded glass wool performed surface treatment in PBT resin) improves 1.31 times in tensile strength in comparison with PBT resin simple substance (Reference 9).

And high strength was provided in comparison with FRTP (Reference 10) contained 30 wt % of chopped strand, it was confirmed that FRTP (Example 4) containing glass wool is not inferior in surface strength in comparison with conventional FRTP.

Example 5

Syndiotactic polystyrene (SPS) resin (Zarec S-04 made by Idemitsu Kosan Co., Ltd.) was used as the matrix thermoplastic resin, 3-glycidoxypropyltrimethoxysilane (Z-6040 made by Toray-Dow Corning Co., Ltd.) and 3-methacryroxy propyl trimethoxy silane (Toray Dow-Corning Z-6030) were used as the silane coupling agent, epoxy resin (EM-058 made by Adeca Co., Ltd.) was used as the film former.

Prepared glass wool by centrifuge method using spinner, and carried out surface treatment to the glass wool by spraying a solution including a silane coupling agent and/or film former from binder nozzle.

After drying the glass wool at 150 degrees Celsius for one hour, crushed the glass wool so that a mean length became 600 μm by cutter mil. And kneaded the glass wool with SPS resin using laboplastmil, and prepared FRTP (Example 5)

Pressed FRTP while heating at 300 degrees Celsius, this temperature is the melting point of SPS. Subsequently, punch FRTP with lever-type cutting machine, and made pulling specimen of JIS K 7113 2 type, then measured tensile strength with pulling testing equipment.

TABLE 5

| | | | Example | | | Reference |
|---|---|---|---|---|---|---|
| | | | 5-1 | 5-2 | 5-3 | 11 |
| Blending | SPS resin S-104 | wt % | 70.0 | 70.0 | 70.0 | 100 |
| | silane coupling agent z-6011 | | 0.08 | 0.07 | | |
| | silane coupling agent z-6030 | | | | 0.08 | |
| | film former EM-058 | | | 0.70 | | |
| | glass wool | | 29.9 | 29.2 | 29.9 | 0 |
| characteristic evaluation | tensile strength | MPa | 38.4 | 40.6 | 37.2 | 30.0 |

As shown in Table 5, it is confirmed that FRTP (Example 5-1, Example 5-2, Example 5-3) performed surface treatment has 1.28 times, 1.35 times and 1.24 times strength improvement for each in comparison with SPS resin simple substance (Reference 11).

INDUSTRIAL APPLICABILITY

According to the present invention, it becomes possible to offer a composite forming material by kneading glass wool to thermoplastic resin, and when using the composite forming material, poor appearance is not generated even if making ejection casts with a thickness of 1 mm or less.

The invention claimed is:

1. A composite forming material comprising fiberglass and a thermoplastic resin wherein the fiberglass is glass wool fibers, said fibers having thereon a surface treatment including a film former which forms a film on a surface of the glass wool, and a silane coupling agent, wherein the mean length of the glass wool fibers is 600 μm, and the average diameter is 3.4 μm.

2. A composite forming material comprising fiberglass and a thermoplastic resin wherein the fiberglass is glass wool fibers, said fibers having thereon a surface treatment including a film former which forms a film on a surface of the glass wool, and a silane coupling agent, wherein the weight percent of the silane coupling agent to the glass wool is 0.24 wt. % and the weight percent of the film former to the glass wool is 2.4 wt. %, the mean length of the glass wool fiber is 600 μm, and the average diameter is 3.4 μm.

* * * * *